Oct. 4, 1932.    O. F. GRAEBNER ET AL    1,880,385
PIECE KICK-UP AND SEAT PAN
Filed Feb. 12, 1931    2 Sheets-Sheet 1

INVENTORS
Otto F. Graebner,
James Venko.
BY
Harness Dickey Pierce & Hann
ATTORNEYS.

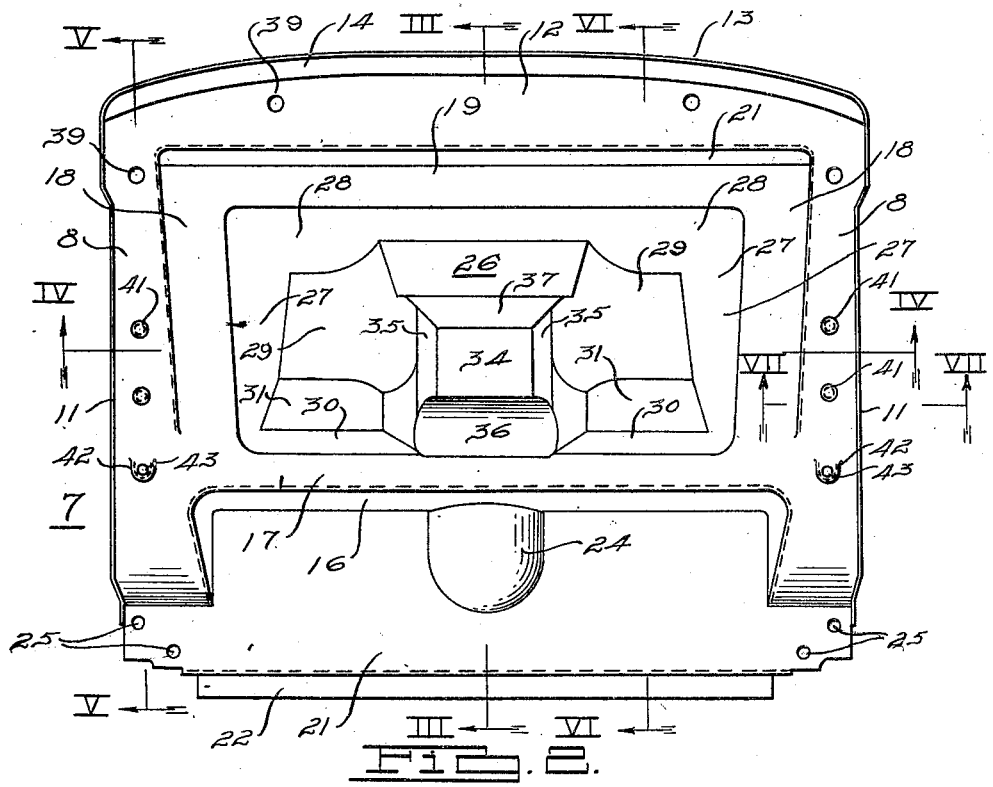
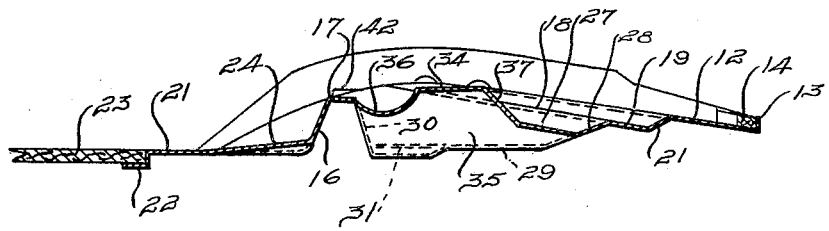
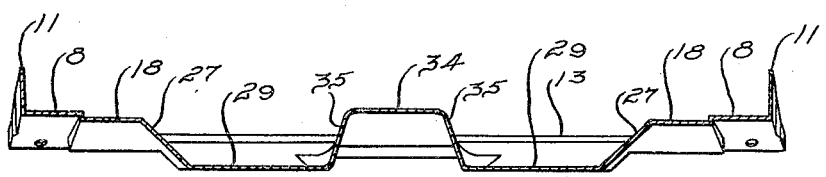

Patented Oct. 4, 1932

1,880,385

UNITED STATES PATENT OFFICE

OTTO F. GRAEBNER AND JAMES VEHKO, OF DETROIT, MICHIGAN, ASSIGNORS TO THE MURRAY CORPORATION OF AMERICA, A CORPORATION OF DELAWARE

PIECE KICK-UP AND SEAT PAN

Application filed February 12, 1931. Serial No. 515,293.

Our invention relates to automobile bodies and particularly to the rear portion of the sills and seat support.

With the advent of low body designs in this art, it became necessary to decrease the clearance between the body and the axles by changing the design of the supporting structure between the axle and the body. To accomplish this, and to provide sufficient clearance for the movement of the rear axle housing and gear case relative to the body, it became the practice to offset the rear portion of the sill upwardly. This offset portion of the sill is known in the body art and will be hereinafter referred to as the main sill kick-up.

It has been the practice to provide separate offset or kick-up portions for the rear of each sill, constructed of either wood or metal, and also to provide a separate seat pan or support which extended between and was attached to said kick-up portions of the sills, and, in some cases, means separate from the seat pan for bracing and securing together the kick-up members. This practice necessitates a number of differently shaped parts and the plurality of operations and tools necessary to the manufacture, handling and securing together of such parts.

The object of our invention is to provide a sill-kick-up which incorporates the necessary extensions of both sills and the bracings therebetween and a seat support, with a unit member which is formed from a single metal sheet, at a single operation and which eliminates the labor and equipment necessary to the manufacture and assembly of the numerous parts now commonly used for this purpose.

Another object of our invention is to provide a kick-up unit for attachment to the main sills of a vehicle body which is formed independently of the sills and body, and which includes the kick-up portion of both sills, the necessary bracings, the seat support, a storage compartment beneath the seat, and a portion of the floor of the body.

With these and other objects, which will become apparent, in mind, our invention will best be understood by referring to the following description in conjunction with the drawings, wherein:

Fig. 2 is an enlarged plan view of the kick-up and seat support illustrated in Fig. 1.

Fig. 3 is a sectional view of the structure illustrated in Fig. 2 taken along the line III—III thereof.

Fig. 4 is a sectional view of the structure illustrated in Fig. 2 taken along the line IV—IV thereof.

Figure 1:
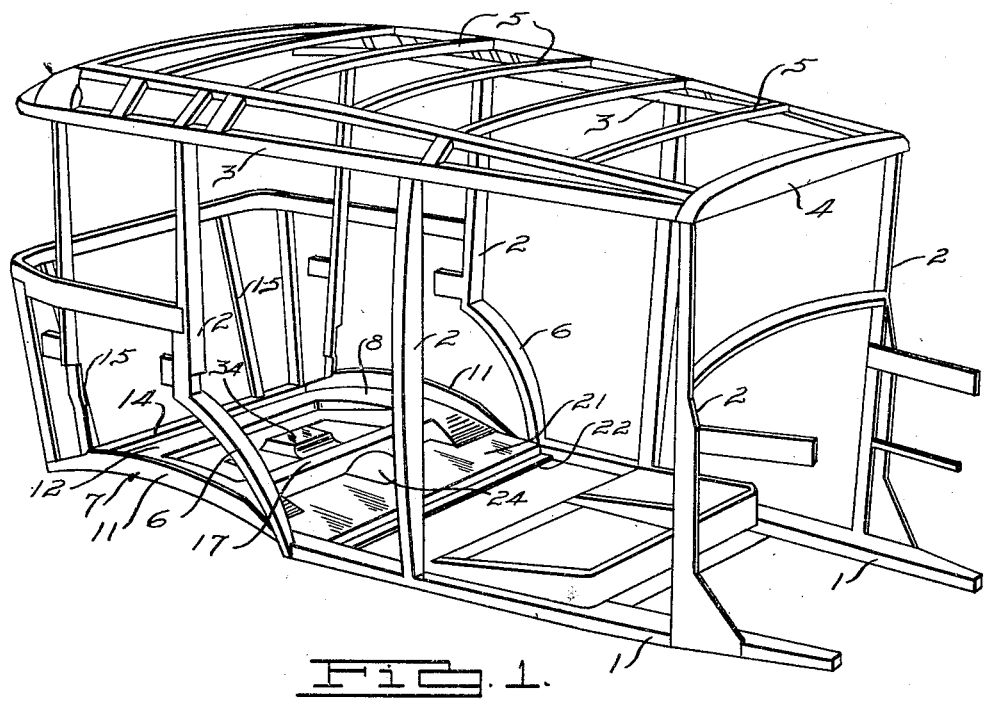
Fig. 1 is a perspective view, in side elevation, of a carriage frame embodying features of our invention.
Figure 5:
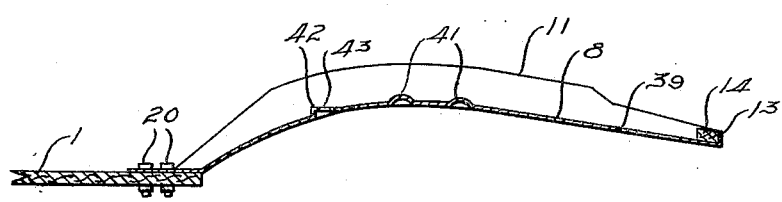
Fig. 5 is a sectional view of the structure illustrated in Fig. 2 taken along the line V—V thereof.

Our invention is illustrated in connection with a composite automobile body, so called because it is constructed of both metal and wood parts. The body frame illustrated in Fig. 1, includes side sills 1, upright pillars 2, side roof rails 3, winshield header 4, a plurality of roof bows 5 and the various sill fittings and reinforcing members, the employment of which is well known in the art.

Referring particularly to our sill construction, it will be noted that the side sills 1 extend rearwardly to the rear pillar extensions 6 and are substantially flat and constructed of wood. The side sills are offset upwardly beyond this point to constitute the kick-ups heretofore referred to. These kick-ups, heretofore, were substantially of the same cross-sectional dimensions as the main sill 1 and were constructed usually of wood or metal, a separate extension for each sill. It will be readily apparent that considerable bracing was required to tie together and strengthen the individual sills at the kick-ups, especially so in view of the seat-supporting structure to be provided therebetween and supported thereon.

In practicing our invention, we form the kick-up, including the necessary strengthening and bracing means, the seat support, the seat pan including a storage compartment, and a portion of the floor of the body, from a single metal sheet, and, except for a blanking and possibly a trimming operation, by a single stamping operation. Considerable strength is added to the body frame when our combination kick-up is employed and the weight of the ensuing structure may be somewhat reduced. We are also enabled to eliminate the labor and equipment necessary to the manufacture and assembly of the various separate parts now conventionally used to form the structure which our unitary member replaces, and thereby reduce the cost of the body without sacrificing strength or adding weight.

Referring particularly to Figs. 2 to 6 inclusive, we disclose a unit member 7 which includes the right and left main sill kick-up extensions for each side sill of the body. This member is formed from a single sheet of steel of the proper gauge and ductility to permit and to withstand the drawing operation which is accomplished by a set of dies of proper contours to form the desired shape between which the sheet is drawn or stamped as it is sometimes designated among those familiar with the art. The stamping or drawing operation and the equipment for accomplishing it are of conventional and known types.

The unit member 7 disclosed in Fig. 2 comprises in its side marginal portions sill kick-up or extensions 8 which are of general arcuate shape and are provided with upwardly extending side flanges 11 along their outer sides. The kick-ups are joined across their rear extremity by a flat portion 12 having a flange 13 thereon which is a continuation of the flanges 11. A strip of wood 14 is fitted into the flange portion 12 as disclosed in Figures 2 and 3, to which the rear seat strainers 15, shown in Fig. 1, are attached. The metal between the front portion of the main sill kick-ups 8 is drawn upwardly to form a downwardly presenting channel 16 which constitutes a brace portion between the two kick-ups. The top surface 17 of the channel is continued rearwardly along each of the sill kick-up portions 8 to provide surfaces 18 which are joined across their rearmost end by a surface portion 19, all of which are offset downwardly relative to the surfaces 8 and 12 and constitute a rearwardly sloping deck for receiving and supporting the seat cushion of the rear body compartment.

Figure 6:
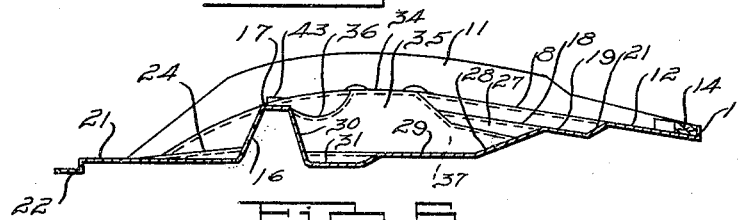
Fig. 6 is a sectional view of the structure illustrated in Fig. 2 taken along the line VI—VI thereof.

The portion 24 extending forwardly of the channel portion 16 constitutes a portion of the floor of the rear compartment of the body and is provided with an offset portion 22, shown in Figs. 2, 3 and 6, for engaging and supporting the rear floor board 23 flush with the surface of the portion 21. The floor portion 21 is provided with an arcuate raised portion 24 midway its width between the kick-ups 8 for the purpose of providing clearance for the propeller shaft housing (not shown). Holes 25 are provided in the floor portion 21 and in the rearward end of the sill 1, through which bolts 20 extend for the purpose of connecting the sills to the unit member 7.

The portions 26, 29 and 31 between the portions 17, 18 and 19, and adjacent thereto are offset downwardly to provide a storage compartment beneath the seat, and the central portions 34 and 36 of the unit are offset upwardly to provide clearance for the differential gear case on the rear axle of the car.

The depressed portions 26, 29 and 31 are joined to the portions 17, 18 and 19 by the inclined walls 27, 28 and 30 and to the raised portions 34 and 36 by the inclined walls 35 and 37.

Holes 39 are provided in the unit member 7 for receiving bolts to secure the body to the chassis frame (not shown). The raised bosses 41 provide clearance for the heads of the rivets or bolts securing the cross members in the chassis (not shown). Other bosses 42 are also provided adjacent the forward ends of the portions 8 and have holes 43 therein through which bolts may extend to secure a front retaining bar (not shown) which is provided transversely of the unit to prevent the seat cushion from sliding forwardly.

Figure 7:
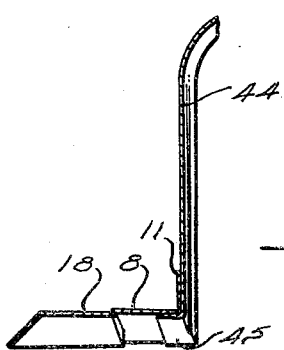
Fig. 7 is a sectional view of the structure illustrated in Fig. 2 taken along the line VII—VII thereof, and discloses a method of attaching a wheel house to the kick-up.

Fig. 7 illustrates how a wheel housing 44 may be secured to the side of the unit. The lower margin of the wheel housing 44 is provided with an inwardly extending lateral flange 45 which fits underneath the side of the unit and may be welded or otherwise secured thereto, the lower part of the vertical portion of the housing rests against the flange 11 and may also be welded or otherwise secured thereto if desired.

It will thus be seen that our unit member for a vehicle body is made from a single sheet of metal and includes the main sill kick-ups, the seat support, the seat pan and a portion of the rear compartment floor, and that the formation of the member provides the necessary bracings and reinforcements.

While we have described and illustrated but a single embodiment of our invention, it will be apparent to those skilled in the art, that many changes, additions, omissions and substitutions may be made therein to strengthen different portions of the unit member, to provide greater clearance between the member and the gear case housing and to provide surfaces of different slope and configuration without departing from the spirit and scope of our invention as set forth in the accompanying claims.

We claim as our invention:

1. In automobile body construction the combination with body side sills extending rearwardly to a point in front of the rear wheels and axle, of an underframe member for supporting the body over the rear axle and wheels comprising a single metal stamping including upwardly offset extensions for said sills, a floor supporting portion and a rear seat supporting portion.

2. In automobile body construction the combination with body side sills extending rearwardly to a point in front of the rear wheels and axle, of an underframe member for supporting the body over the rear axle and wheels comprising a single metal stamping including upwardly offset extensions for said sills, a floor supporting portion, a rear seat supporting portion and a rear frame cross member.

3. In automobile body construction the combination with body side sills extending rearwardly to a point in front of the rear wheels and axle, of an underframe member for supporting the body over the rear axle, and wheels comprising a single metal stamping including upwardly offset extensions for said sills, a floor supporting portion, a rear seat supporting portion upwardly offset relative to said floor supporting portion and a storage compartment encompassed by said seat supporting portion.

4. In automobile body construction the combination with body side sills extending rearwardly to a point in front of the rear wheels and axle, of an underframe member for supporting the body over the rear axle and wheels comprising a single metal stamping including upwardly offset extensions for said sills, and a rear seat supporting portion downwardly offset and rearwardly sloping relative to said sill extensions.

5. In automobile body construction the combination with body side sills extending rearwardly to a point in front of the rear wheels and axle, of an underframe member for supporting the body over the rear axle and wheels comprising a single metal stamping including upwardly offset extensions for said sills, and a rear seat supporting portion downwardly offset and rearwardly sloping relative to said sill extensions, said single metal stamping having upwardly extending flanges along its sides and rear to which wheel housings and rear panels may be secured.

6. In automobile body construction the combination with body side sills extending rearwardly to a point in front of the rear wheels and axle, of an underframe member for supporting the body over the rear axle and wheels comprising a single metal stamping including upwardly offset extensions for said sills, a floor supporting portion, a rear seat supporting portion and a rear frame cross member, said single metal stamping having upwardly extending flanges along its sides and rear to which wheel housings and rear panels may be secured.

7. In automobile body construction the combination with body side sills extending rearwardly to a point in front of the rear wheels and axle, of an underframe member for supporting the body over the rear axle and wheels comprising a single metal stamping including upwardly offset extensions for said sills, a rear seat supporting portion downwardly offset and rearwardly sloping relative to said sill extensions and a downwardly offset portion encompassed by said seat supporting portion forming a storage compartment having an upwardly offset portion to provide clearance for a propeller shaft housing.

8. In automobile body construction the combination with body side sills extending rearwardly to a point in front of the rear wheels and axle, of an underframe member for supporting the body over the rear axle and wheels comprising a single metal stamping including upwardly offset extensions for said sills, a floor supporting portion, a rear seat supporting portion upwardly offset relative to said floor supporting portion and a storage compartment beneath said rear seat having an upwardly offset portion to provide clearance for a propeller shaft housing.

9. In automobile body construction the combination with body side sills extending rearwardly to a point in front of the rear wheels and axle, of an underframe member for supporting the body over the rear axle and wheels comprising a single metal stamping including upwardly offset extensions for said sills, a floor supporting portion, a rear seat supporting portion upwardly offset relative to said floor supporting portion, a storage compartment beneath said rear seat having an upwardly offset portion to provide clearance for a propeller shaft housing, said floor portion having an upwardly offset portion in continuation of said offset portion in said storage compartment.

10. In automobile body construction the combination with body side sills extending rearwardly to a point in front of the rear wheels and axle, of an underframe member for supporting the body over the rear axle and wheels comprising a single metal stamping including upwardly offset extensions for said sills, and a floor supporting portion having an upwardly offset portion to provide clearance for a propeller shaft housing.

11. In automobile body construction the combination with body side sills extending rearwardly to a point in front of the rear wheels and axle, of an underframe member for supporting the body over the rear axle and wheels comprising a single metal stamping including upwardly offset extensions for said sills, a floor supporting portion having an upwardly offset portion to provide clearance for a propeller shaft housing, a rear seat supporting portion upwardly offset relative to said floor supporting portion, a storage compartment beneath said rear seat having an upwardly offset portion to provide clearance for the gear case, communicating with said upwardly offset portion in the floor.

12. In automobile body construction the combination with body side sills extending rearwardly to a point in front of the rear wheels and axle, of an underframe member for supporting the body over the rear axle and wheels comprising a single metal stamping including upwardly offset extensions for said sills, having a main web portion, a rear cross member for said extensions having a web portion in continuation of the web portions of the extensions and an upwardly directed flange on the web portions encompassing the extensions and the cross member.

13. In automobile body construction the combination with body side sills extending rearwardly to a point in front of the rear wheels and axle, of an underframe member for supporting the body over the rear axle and wheels comprising a single metal stamping including upwardly offset extensions for said sills having an angular cross-section and a rear cross member for said extensions having a like angular cross-section in continuation of that of the extensions.

14. In automobile body construction the combination with body side sills extending rearwardly to a point in front of the rear wheels and axle, of an underframe member for supporting the body over the rear axle and wheels comprising a single metal stamping including upwardly offset extensions for said sills, a floor supporting portion, a rear seat supporting portion and a rear frame cross member, the extensions and the cross member having a cross-section of substantially Z-shape.

15. In automobile body construction the combination with body side sills extending rearwardly to a point in front of the rear wheels and axle, of an underframe member for supporting the body over the rear axle and wheels comprising a single metal stamping including upwardly offset extensions for said sills, a floor supporting portion, a rear seat supporting portion and a rear frame cross member, the extensions and the cross member having a continuous main web portion provided with a flange.

In testimony whereof we affix our signatures.

JAMES VEHKO.
OTTO F. GRAEBNER.